(12) United States Patent
Yanai

(10) Patent No.: US 6,742,847 B2
(45) Date of Patent: Jun. 1, 2004

(54) FRAME STRUCTURE FOR USE IN A VEHICLE SEAT BACK

(75) Inventor: Kunihito Yanai, Takanezawa-machi (JP)

(73) Assignee: Delta Kogyo Co., Ltd., Aki-gun (JP)

( * ) Notice: Subject to any disclaimer, the term of this patent is extended or adjusted under 35 U.S.C. 154(b) by 0 days.

(21) Appl. No.: 10/369,128

(22) Filed: Feb. 20, 2003

(65) Prior Publication Data

US 2003/0160482 A1 Aug. 28, 2003

(30) Foreign Application Priority Data

Feb. 20, 2002 (JP) ........................................ 2002-043743

(51) Int. Cl.⁷ ................................................ B60N 2/42
(52) U.S. Cl. ................................ 297/452.2; 297/216.13
(58) Field of Search ........................... 297/452.18, 452.2, 297/216.13

(56) References Cited

U.S. PATENT DOCUMENTS

| | | | | |
|---|---|---|---|---|
| 3,899,211 A | * | 8/1975 | Barecki | 297/451.1 |
| 5,447,360 A | * | 9/1995 | Hewko et al. | 297/452.18 |
| 5,575,533 A | * | 11/1996 | Glance | 297/452.2 |
| 5,676,423 A | | 10/1997 | Pedronno et al. | |
| 5,716,100 A | * | 2/1998 | Lang | 297/378.12 |
| 5,829,831 A | * | 11/1998 | Sharman | 297/378.12 |
| 6,347,836 B1 | | 2/2002 | Hayotte | |
| 6,352,311 B1 | * | 3/2002 | Hayotte | 297/452.2 |
| 6,416,104 B1 | * | 7/2002 | Fisher et al. | 296/37.16 |

FOREIGN PATENT DOCUMENTS

| | | |
|---|---|---|
| EP | 0 432 824 A | 6/1991 |
| EP | 0 853 020 A | 7/1998 |
| EP | 0 992 393 A | 4/2000 |
| FR | 2698832 A1 * | 12/1992 |
| GB | 2 298 123 A | 8/1996 |

* cited by examiner

Primary Examiner—Peter M. Cuomo
Assistant Examiner—Joseph Edell
(74) Attorney, Agent, or Firm—Smith Patent Office

(57) ABSTRACT

A seat back in a vehicle rear seat provided before a trunk includes a seat back frame structure in which a peripheral frame member is arranged along the periphery of a substantially rectangular panel frame member, and a reinforcing pipe frame member having opposite ends thereof coupled to an upper part and a lower part of the peripheral frame member and having an intermediate part formed to pass an external-force receiving portion of the panel frame member where an external force resulting from a possible movement of a luggage placed in the trunk is received. There can be provided a frame structure for the vehicle seat back having an improved strength against an external force exerted resulting from the movement of the luggage placed in the trunk.

2 Claims, 5 Drawing Sheets

FRAME STRUCTURE FOR USE IN A VEHICLE SEAT BACK

BACKGROUND OF THE INVENTION

Field of the Invention

This invention relates to a frame structure for use in a vehicle seat back.

A rear seat before a trunk or luggage of a vehicle is generally comprised of a seat cushion having a lower part fixed to the floor of a passenger compartment and a seat back having a lower part supported on a rear part of the seat cushion. There are two types of seat backs, one being inclinable forward and the other being fixed to a vehicle body.

Such a seat back has, as shown in FIG. 7, a seat back frame structure 100 in which a peripheral frame member 102 is arranged along the periphery of a substantially rectangular panel frame member 101, and a pad and an outer trim are so provided as to cover the seat back frame structure 100.

In recent year, various measures have been studied to improve the safety of automotive vehicles. One essential point is to set a withstand load, which is exerted on the rear seat upon the movement of a luggage in the trunk at the back, at a specified value or higher. Motor-Vehicle Rule ECE No. 17 is known as a standard according to which a standard luggage having a weight of 18 kg and a colliding surface of 300 mm (vertical dimension)×300 mm (horizontal dimension) is brought into contact with the rear surface of the seat back by an inertial force.

The seat back frame structure of the conventional rear seat is constructed such that the peripheral frame member is arranged along the periphery of the panel frame member. Accordingly, when a large load acts on a substantially middle part of the seat back in a test conducted in accordance with the aforementioned motor-vehicle rule, there is the likelihood that the panel frame member is dented to project forward, and the rear seat is judged to lack the strength against the large load.

SUMMARY OF THE INVENTION

It is an object of the present invention to provide a seat back frame structure which is free from the problems residing in the prior art, It is another object of the present invention to provide a seat back frame structure which has the strength against an external force exerted upon a possible movement of a luggage placed in a trunk of the vehicle.

According to an aspect of the present invention, a frame structure is used in a vehicle seat back, and comprises: a panel frame member having a substantially rectangular shape; a peripheral frame member arranged along the periphery of the panel frame member; and a reinforcing frame member having opposite ends coupled to an upper part and a lower part of the peripheral frame member; and an intermediate part corresponding to an external-force receiving portion of the panel frame member for receiving an external force resulting from a possible movement of a luggage placed in a trunk of the vehicle.

These and other objects, features and advantages of the present invention will become more apparent upon reading the following detailed description along with the accompanying drawings.

DETAILED DESCRIPTION OF THE PREFERRED EMBODIMENTS OF THE INVENTION

Figure 3:
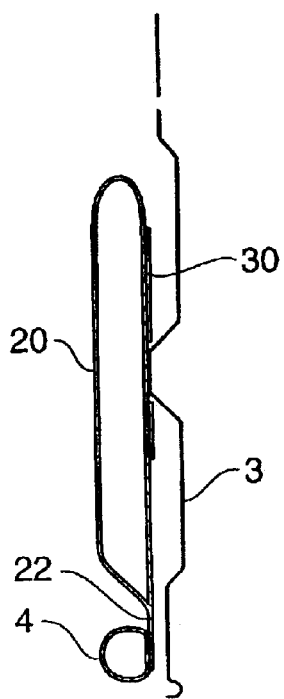
FIG. 3 is a sectional view take along the line III—III in FIG. 1.

A vehicle seat back of a two-piece type rear seat of a sedan car embodying the invention will be described with reference to FIGS. 1 and 3. The vehicle seat back has a wider seat back on the right side.

The vehicle seat back is provided with a seat back frame structure 2 including a panel frame member 3 and a peripheral frame member 4, and a reinforcing pipe frame member 20 as a reinforcing frame member having the opposite ends coupled to the upper and bottom sides of the peripheral frame member 4.

Figure 1:
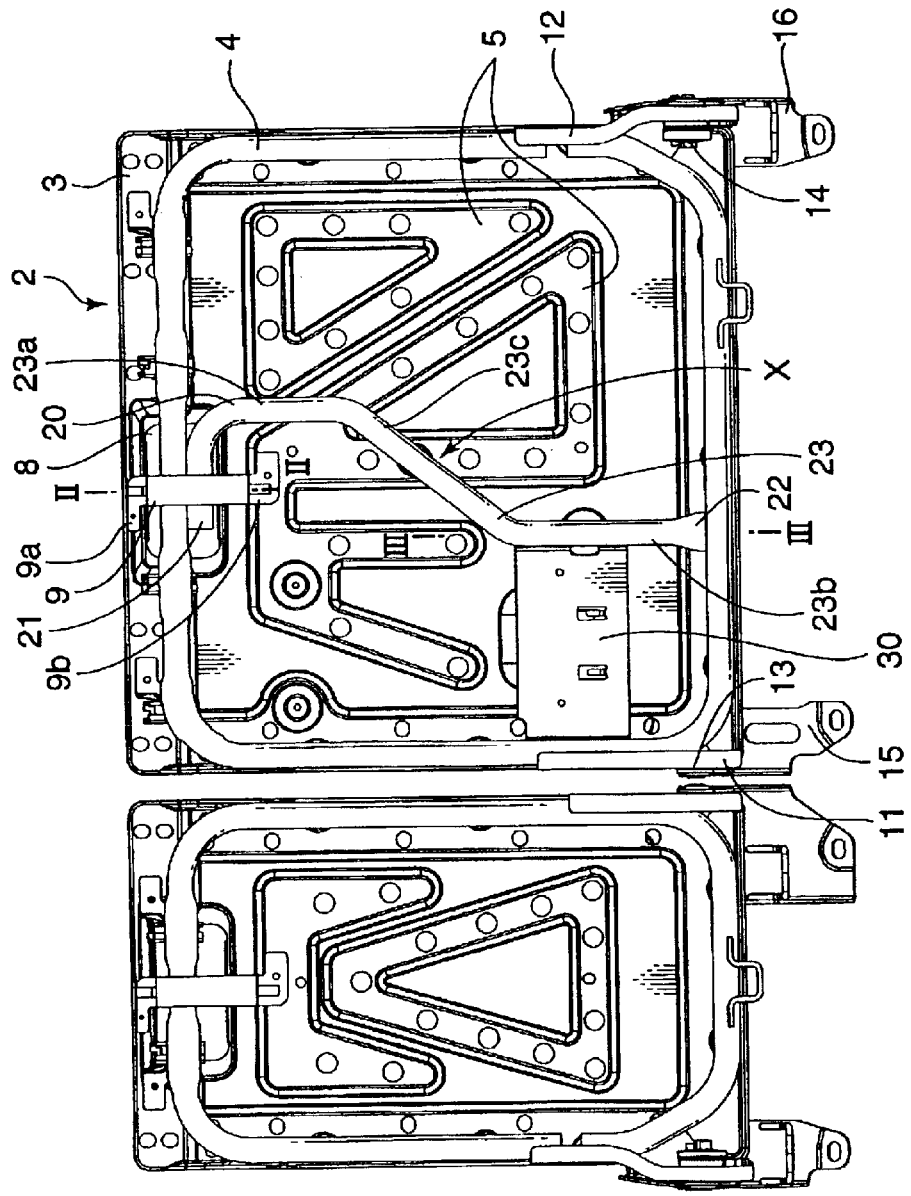
FIG. 1 is a front view showing a vehicle seat back of a two-piece type rear seat of a sedan car, embodying the invention.
Figure 2:
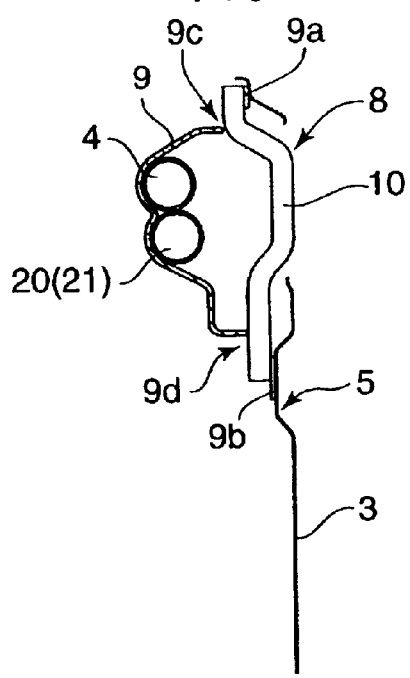
FIG. 2 is a sectional view taken along the line II—II in FIG. 1.

The panel frame member 3 is made of a substantially rectangular metallic plate such as a steel plate, and formed with forward-protruding projected portions 5 in a specified pattern (see FIGS. 1 and 2). A striker hole 8 is formed in an upper middle of the panel frame member 3, and opposite ends 9a, 9b of a plate-shaped striker bracket 9 as shown in FIG. 2 are mounted on the front side of the panel frame member 3 at the opposite sides of the striker mount hole 8 by welding. Through holes 9c, 9d are formed at positions of the respective ends 9a, 9b near their centers. The opposite ends of a bar-shaped striker 10 are fixed to the front sides of the opposite ends 9a, 9b through the through holes 9c, 9d by welding.

The peripheral frame member 4 is made by working a metallic plate such as a steel plate and is arranged along the periphery of the front side of the panel frame member 3 as shown in FIG. 1. An upper part of the peripheral frame member 4 is passed through behind the striker bracket 9 at the inner sides of the striker 10 and the striker bracket 9 (see FIG. 2). Such a peripheral frame member 4 is welded to the rear surfaces of the panel frame member 3 and the striker bracket 9, and mounting frame members 11, 12 used to mount the seat back on a vehicle body are secured to the left-lower and right-lower parts of the peripheral frame member 4 by welding. Vehicle mounting portions 15 and 16 are so mounted on the mounting frame members 11, 12 via shafts 13, 14 as to be rotatable within a specified angle range, respectively. The respective vehicle mounting portions 15, 16 are secured to the unillustrated vehicle body by bolts.

The striker 10 is so mounted as to be detachably engageable with a catcher (not shown) provided on the vehicle body. The seat back can be inclined forward via the shafts 13, 14 with the striker 10 detached, whereas it is fixed in its standing posture slightly inclined backward with the striker 10 engaged.

The reinforcing pipe frame member 20 has its opposite ends 21, 22 coupled to upper and lower parts of the peripheral frame member 4. The upper end 21 of the reinforcing pipe frame member 20 is passed through behind the striker bracket 9 at the inner sides of the striker 10 and the striker bracket 9 and secured to the striker bracket 9 by welding as shown in FIG. 2. On the other hand, the lower end 22 of the reinforcing pipe frame member 20 is secured to the rear surface of the peripheral frame member 4 by welding while being squashed as shown in FIG. 3. An intermediate part 23 of the reinforcing pipe frame member 20 is so bent as to pass a position X substantially in the center of the panel frame member 3. More specifically, this intermediate part 23 includes an upper portion 23b coupled to the right side of the upper end 21, a lower portion 23b extending upward from the lower end 22 located more toward the left side than the striker bracket 9, and a middle portion 23c coupled to the upper and lower portions 23a, 23b and inclined to pass the position X. In other words, the intermediate part 23 has bent portions at two positions: a position between the upper portion 23a and the middle portion 23c and a position between the middle portion 23c and the lower portion 23b. The position X is set at a position (external-force receiving portion) where a standard load is exerted in a test conducted in accordance with the aforementioned motor-vehicle rule in this embodiment. Identified by 30 in FIG. 1 is a plate-shaped bracket for mounting an arm rest (not shown) to be provided at the transverse center of the seat back frame structure 2. The right end of the bracket 30 is secured to the reinforcing pipe frame member 20 by welding, as shown in FIG. 3, whereas the left end thereof is secured to the peripheral frame member 4 by welding, although not shown.

In this embodiment, the intermediate part 23 of the reinforcing pipe frame member 20 passes the external-force receiving portion of the panel frame member 3, i.e., the position X where the standard load is exerted in the test conducted in accordance with the motor-vehicle rule, and the opposite ends 21, 22 thereof are coupled to the peripheral frame member 4. Even if a large load acts at the position X from the trunk side resulting from the movement of a standard luggage in the test conducted in accordance with the motor-vehicle rule, the intermediate part 23 of the reinforcing pipe frame member 20 takes up an external force resulting from the movement of the standard luggage, thereby hindering the panel frame member 3 from being dented. As a result, the strength of the seat back frame structure 2 against a large load acting on the external-force receiving portion can be improved.

Further, since the intermediate part 23 of the reinforcing pipe frame member 20 has the bent portions at two positions between the upper portion 23a and the middle portion 23c and between the middle portion 23c and the lower portion 23b, even if a large load is exerted on the intermediate part 23, an external force resulting from the movement of the standard luggage can be easily taken up by the deformation of the intermediate part 23 due to the presence of the bent portions, thereby improving the strength.

Furthermore, the upper end 21 of the reinforcing frame member 20 is not only welded to the upper part of the peripheral frame member 4, but also passed at the inner sides of the highly strong striker 10 and the striker bracket 9 supporting the striker 10 and generally having a high strength. The reinforcing pipe frame member 20, particularly the upper end 21 thereof is securely held onto the seat back frame structure 2 even upon being subjected to an external force. Therefore, strength against the large load acting on the external-force receiving portion resulting from the movement of the standard luggage can be better improved. In addition, since the opposite ends of the plate-shaped bracket 30 for mounting the arm rest (not shown) are secured to the reinforcing pipe frame member 20 and the peripheral frame member 4, the reinforcement of the pipe frame member 20 can be improved by the plate-shaped bracket 30, thereby further enhancing the strength of the seat back frame structure 2.

Figure 4:
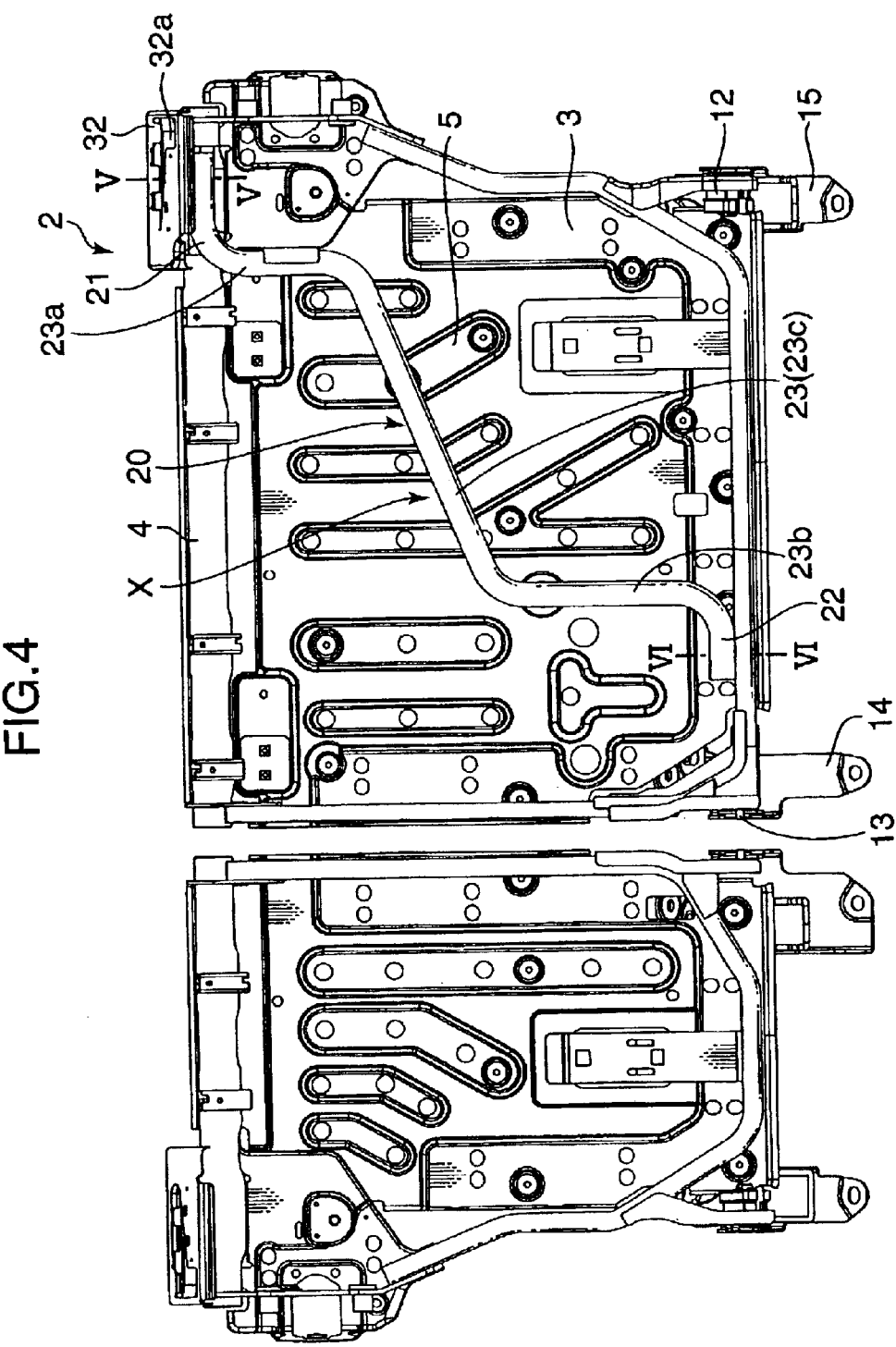
FIG. 4 is a front view showing another vehicle seat back of a two-piece type rear seat of a wagon car, embodying the invention.
Figure 5:
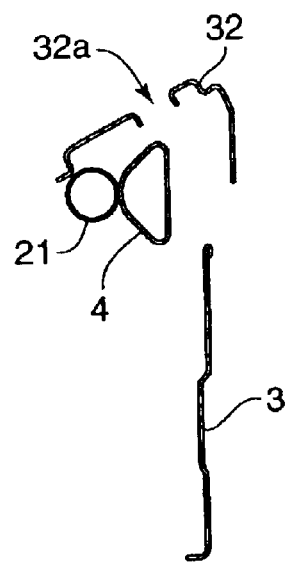
FIG. 5 is a sectional view taken along the line V—V in FIG. 4.
Figure 6:
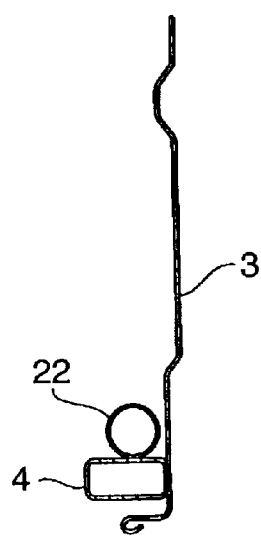
FIG. 6 is a sectional view taken along the line VI—VI in FIG. 4.
Figure 7:
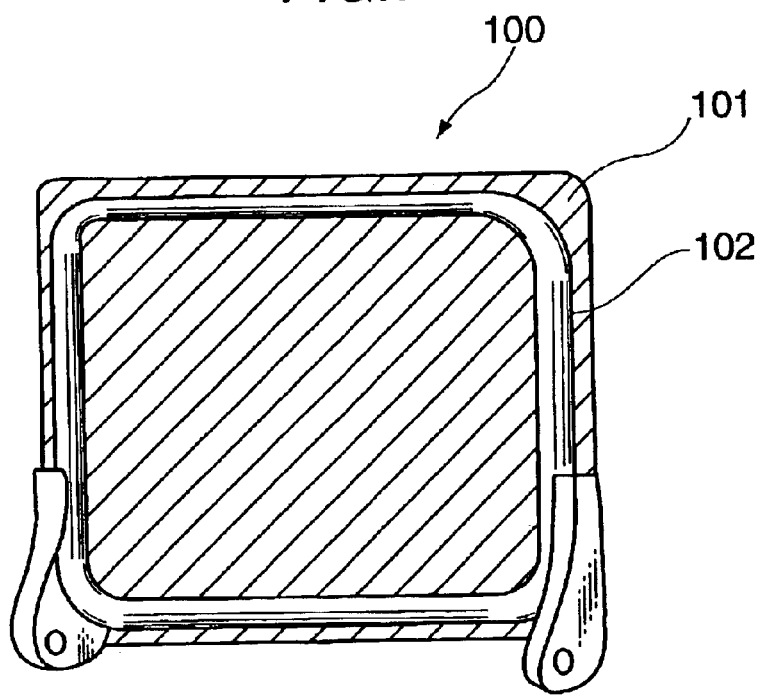
FIG. 7 is a view showing an external configuration of a conventional vehicle seat back.

FIG. 4 is a front view showing another vehicle seat back of a two-piece type rear seat of a wagon car, embodying the invention, wherein the wider seat back on the right side is a vehicle seat back. FIG. 5 is a sectional view taken along the line V—V of FIG. 4, and FIG. 6 is a sectional view taken along the line VI—VI of FIG. 4. The same elements as in FIGS. 1 to 3 are identified by the same reference numerals.

This vehicle seat back is a rear seat of a wagon car, and has a right-upper part detachably mounted on a vehicle body. Although not shown, a mounting portion for mounting the right-upper part of the seat back on the vehicle body is comprised of a striker provided on the vehicle body and a catcher provided on the seat back frame structure 2.

Accordingly, in this embodiment, the seat back frame structure 2 has no striker bracket, and the upper end 21 of the reinforcing pipe frame member 20 is only welded to the upper front side of the peripheral frame member 4 (see FIG. 5). Further, the lower end 22 of the reinforcing pipe frame member 20 is welded to the bottom part of the peripheral frame member 4 as shown in FIG. 6. The intermediate part 23 of the reinforcing pipe frame member 20 has bent portions at two positions between the upper portion 23a and the middle portion 23c and between the middle portion 23c and the lower portion 23b. Identified by 32 in FIGS. 4 and 5 is a seat-belt introducing frame member formed with an opening 32a through which a seat belt is passed. This seat-belt introducing frame member 32 is welded to the panel frame member 3 (welded portion is not shown).

In this embodiment, although an improvement in the reinforcement of the seat back frame structure 2 by the upper end 21 of the reinforcing pipe frame member 20 cannot be obtained, the intermediate part 23 of the reinforcing pipe frame member 20 passes the substantially center position of the panel frame member 3, i.e., the position X where a standard load is received in the test conducted in accordance with the motor-vehicle rule, and the opposite ends 21, 22 of the reinforcing pipe frame member 20 are coupled to the peripheral frame member 4. Accordingly, even if a large load acts at the position X from the trunk side resulting from the movement of the standard luggage, the intermediate part 23 of the reinforcing pipe frame member 20 takes up an external force resulting from the movement of the standard luggage, thereby hindering the panel frame member 3 from being dented. As a result, the strength of the seat back frame structure 2 against a large load acting on the external-force receiving portion can be improved. In addition, since the intermediate part 23 of the reinforcing pipe frame member 20 has the bent portions at two positions between the upper portion 23a and the middle portion 23c and between the middle portion 23c and the lower portion 23b, even if a large load is exerted on the intermediate part 23, an external force resulting from the movement of the standard luggage can be easily taken up by the deformation of the intermediate part 23 due to the presence of the bent portions, thereby improving the strength.

Although the seat back frame structure 2 is not provided with the striker since being of the wagon type in this embodiment, the seat back may be, of course, constructed such that, in order to better hold the upper end 21 of the reinforcing pipe frame member 20 onto the seat back frame structure 2, a striker is provided on the seat back frame structure 2, a catcher is provided on the vehicle body, and the upper end 21 of the reinforcing pipe frame member 20 is coupled to the bracket supporting the striker as in the former embodiment.

The reinforcing pipe frame member is formed such that the intermediate part thereof corresponds to the substantially center of the seat back assuming the test conducted in accordance with the motor-vehicle rule in the foregoing embodiments. However, if other part of the seat back receives an external force, the reinforcing pipe frame member may be formed such that the intermediate part thereof corresponds to such an external-force receiving portion.

The external-force receiving portion is reinforced using one reinforcing pipe frame member in the foregoing embodiments. However, the external-force receiving portion may be reinforced using two or more reinforcing pipe frame members.

The reinforcing pipe frame member has the bent portions at two positions between the upper portion and the middle portion of the intermediate part of the reinforcing pipe frame member and between the middle portion and the lower portion thereof in the foregoing embodiments. However, The intermediate part of the reinforcing pipe frame member may have one or a desired number of bent portions.

Although the pipe material is used for the reinforcing frame member in the foregoing, further, a plate-shaped or bar-shaped material may be used.

The wider one of the rear seats of the two-piece type before the trunk is provided with the reinforcing pipe frame member in the foregoing embodiments. The provision of such reinforcing frame member may be provided not only to the wider rear seat, but also to the narrower rear seat.

The seat back is inclinable forward in the foregoing embodiments. However, the same construction may be applicable to a rear seat fixed to the vehicle body.

As described above, an inventive frame structure is used in a vehicle seat back. The frame structure comprises a panel frame member having a substantially rectangular shape, a peripheral frame member arranged along the periphery of the panel frame member; and a reinforcing frame member arranged in a space defined by the peripheral frame member. The reinforcing frame member has opposite ends coupled to an upper part and a lower part of the peripheral frame member, and an intermediate part corresponding to an external-force receiving portion of the panel frame member for receiving an external force resulting from a possible movement of a luggage placed in a trunk of the vehicle.

In this frame structure, the reinforcing frame member is formed with the intermediate part corresponding to the external-force receiving portion of the panel frame and the opposite ends coupled to the peripheral frame having high strength. Thus, the intermediate part of the reinforcing frame takes up the external force resulting from a possible movement of the luggage to hinder the panel frame from being dented. As a result, the strength against a large load acting on the external-force receiving portion can be improved.

The intermediate part of the reinforcing frame member may be preferably formed with at least one bent portion.

With this construction, even if a large load is exerted on the intermediate part of the reinforcing frame, the external force resulting from the movement of the luggage can be easily taken up by the deformation of the intermediate part due to the presence of the bent portion, thereby improving the strength.

The frame structure may be further provided with a striker bracket for supporting a striker engageable with a catcher provided at a specified position of a body of the vehicle. Further, an upper portion of the peripheral frame member and an upper end portion of the reinforcing frame member may be placed in the striker bracket.

With this construction, the upper end of the reinforcing frame is not only welded to the upper part of the peripheral frame, but also passed through the inner side of the highly strong striker and the striker bracket supporting the striker and generally provided to have the high strength. Thus, the reinforcing frame, particularly the upper end thereof can be securely held onto the seat back even upon being subjected to the external force, with the result that strength against a large load acting on the external-force receiving portion resulting from the movement of the luggage can be further improved.

This application is based on patent application No. 2002-43743 filed in Japan, the contents of which are hereby incorporated by references.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, thereby should be construed as being included therein.

What is claimed is:

1. A frame structure for use in a vehicle seat back, comprising:

a panel frame member having a substantially rectangular shape;

a peripheral frame member arranged along the periphery of the panel frame member; and a reinforcing frame member having:

opposite ends coupled to an upper part and a lower part of the peripheral frame member; and an intermediate part corresponding to an external-force receiving portion of the panel frame member for receiving an external force resulting from a possible movement of a luggage placed in a trunk of the vehicle; and further comprising a striker bracket for supporting a striker engageable with a catcher provided at a specified position of a body of the vehicle, wherein an upper portion of the peripheral frame member and an upper end portion of the reinforcing frame member are placed in the striker bracket.

2. A frame structure according to claim 1, wherein the intermediate part of the reinforcing frame member includes at least one bent portion.

* * * * *